United States Patent [19]
Yamada et al.

[11] Patent Number: 5,706,391
[45] Date of Patent: Jan. 6, 1998

[54] METHOD AND AN APPARATUS FOR PROCESSING INFORMATION

[75] Inventors: Masayuki Yamada; Yasuhiro Komori, both of Kawasaki, Japan

[73] Assignee: Canon Kabushiki Kaisha, Tokyo, Japan

[21] Appl. No.: 666,219

[22] Filed: Jun. 20, 1996

[30] Foreign Application Priority Data

Jun. 21, 1995 [JP] Japan ................... 7-154661

[51] Int. Cl.⁶ ................ G06F 17/00; G10L 5/06
[52] U.S. Cl. ............ 395/2.4; 395/2.31; 395/2.52; 395/2.53
[58] Field of Search ............... 395/2.28, 2.65, 395/2.2, 2, 2.1, 2.54; 348/414, 418; 382/236

[56] References Cited

U.S. PATENT DOCUMENTS 5,535,305  7/1996  Acero et al. ............... 395/2.65
5,592,227  1/1997  Feng ......................... 348/414

OTHER PUBLICATIONS

Tseng et al. "Continuous Probabilistic Acoustic Map for Speaker Recognition," ICASSP '92: Acoustics, Speech and Signal Processing, V. 2, pp. 161–164, Dec. 31, 1992.

E. Bocchieri, "Vector Quantization For The Efficient Computation of Continuous Density Likelihoods", Institute of Electrical And Electronics Engineers, Apr. 27, 1993, vol. 2 of 5, pp. II–692 to II–695.

Primary Examiner—Tariq R. Hafiz
Assistant Examiner—Ji-Yong D. Chung
Attorney, Agent, or Firm—Fitzpatrick, Cella, Harper & Scinto

[57] ABSTRACT

With respect to pattern recognition or the like, this invention is aimed at reducing the arithmetic processing steps of determining analogy between an inputted pattern and reference patterns in order to enhance the speed of the recognition process. At first, a quantization code book is designed to prepare a single-output table and a mixture-output table. Then, referring to these tables, single-output data and mixture-output data are worked out from an inputted pattern. In accordance with these data thus worked out, the adaptability between the inputted pattern and reference patterns is calculated in order to obtain the analogy between them.

14 Claims, 9 Drawing Sheets

METHOD AND AN APPARATUS FOR PROCESSING INFORMATION

BACKGROUND OF THE INVENTION

1. Field of the Invention

The present invention relates to a method and an apparatus for processing information, which deal with pattern information.

The present invention relates to a method and an apparatus for processing information, which are arranged to recognize voice information, image information, and others, for example.

2. Related Background Art

As a pattern recognition technique, there is conventionally a method whereby to prepare reference patterns in advance, and to define the one that may be best adaptable to an inputted pattern as the result of recognition from among the reference pattern thus prepared.

Usually, the inputted pattern is a feature vector provided by combining plural amounts of distinctive features.

On the other hand, each of the reference patterns is expressed as a feature vector representing a recognition result or as a function having a feature vector as its input.

In the former, its adaptability to the pattern, on which a reference pattern is inputted, is expressed as a distance between the feature vector of the reference pattern and the feature vector of the inputted pattern. In the latter, the adaptability between the reference pattern and inputted pattern is expressed as a value obtainable by inputting the feature vector of the inputted pattern into the function serving as the reference pattern.

Also, as the reference pattern function in the latter case, a multiple dimensional probability density function is often applied. In other words, given an inputted feature vector as x, a probability density function of the sth reference pattern as $b_s(\cdot)$, the adaptability between the sth reference pattern and the inputted pattern is:

$$b_s(x) \tag{1}$$

As this probability density function, a function such as Gaussian function is used. Also, a mixture density function, which is the sum of a plurality of weighted probability functions, may be used in some cases. When a mixture density function is used, the adaptability described above is expressed as follows; where the mixture number of the sth reference pattern is $M_s$, mth probability density function is $b_{s,m}(\cdot)$, and the weight of the mth probability density function of the sth reference pattern is $W_{s,m}$:

$$b_s(x) = \sum_{m}^{M_s} w_{s,m} b_{s,m}(x) \tag{2}$$

Further, assuming that the feature vectors between each of the dimensions are not correlated in the expression (2), the following may be made a reference pattern function:

$$b_s(x) = \sum_{m}^{M_s} w_{s,m} \cdot \prod_{i=1}^{N} b_{s,m,i}(x_i) \tag{3}$$

where $x_i$ is the ith dimension of the amount of distinctive feature of the inputted vector x; the $b_{s,m,i}(\cdot)$ is the probability density function corresponding to the ith dimension of the mth probability distribution of the sth reference pattern; and the N is the dimensional number of the feature vector space.

Also, for an actual pattern recognition, the $b_s(\cdot)$ is only the adaptability between an inputted vector and a reference pattern. Therefore, it is unnecessary for the $b_s(\cdot)$ to be a probability density function in its strict sense. Particularly, it may be possible to interpret the $b_s(\cdot)$ as a distance between the inputted vector and reference pattern vector. Further, the $b_s(\cdot)$ may be a general function other than the distance function. Therefore, in making the description thereof, it is assumed to regard this function as a "reference pattern function" or an "adaptability function", instead of using the term "probability density function".

Also, for a voice recognition or the like, an HMM (hidden Markov Model) is often applied. In this case, the reference pattern corresponds to each state of the HMM, and the adaptability described above becomes an output probability that outputs the pattern having each state of the inputted HMM.

Now, as a method for performing a high-speed calculation with respect to an input x in accordance with the expression (3), there is the one whereby to apply the Scalar quantization to each dimensional value of the inputted vector.

This application executes the following process:

First, the process given below is carried out before a pattern recognition.

1. With respect to each dimension i, the representative set of input values, $\{\xi_{i,q} | q=1, 2, \ldots Q_i\}$, is prepared. Here, $Q_i$ is the number of the representative values at the ith dimension.

2. With respect to all the $\xi_{i,q}$, $b_{s,m,i}(\xi_{i,q})$ is calculated to produce the table T (s, m, i, q).

Second, the following process is executed at the time of a pattern recognition:

3. For each of the dimensional values $x_i$ of the input x, a number $q_i$ is obtained so that the input value of $$(\xi_{i,q_i} - x_i)^2$$

becomes the smallest (Scalar quantization).

4. With respect to each of $\hat{q}_i$, the table reference is conducted to obtain the following:

$$T(s, m, i, \hat{q}_i)$$

5. From the $T(s, m, i, \hat{q}_i)$, an express (4) is worked out to obtain the approximate value of $\hat{b}_s(x)$.

$$\hat{b}_s(x) = \sum_{m}^{M_s} w_{s,m} \cdot \prod_{i=1}^{N} T_{(s,m,i,\hat{q}_i)} \tag{4}$$

With the processes described above, the computation of $\hat{b}_s(x)$ can be carried out simply at a high speed.

Also, for the actual pattern recognition, the log $b_s(\cdot)$ is often used instead of the $b_s(\cdot)$ from the viewpoint of a simpler calculation. In this case, the expression (3) should be expressed as follows:

$$\log b_s(x) = \text{addlog}_{m}^{M_s} \left\{ w_{s,m} + \sum_{i=1}^{N} \log b_{s,m,i}(x_i) \right\} \tag{5}$$

Here, the addlog calculation is as follows:

$$\text{addlog}_{k} a_k = \log \sum_{k=1}^{K} \exp(a_k) \tag{6}$$

Even when this logarithm is used, the calculation can be executed at a higher speed as given below by the application of the Scalar quantization described above.

$$\log \hat{b}_s(x) = \underset{m}{\mathrm{addlog}} \left\{ w_{s,m} + \sum_{i=1}^{N} T_{(s,m,i,\hat{q}i)} \right\} \quad (7)$$

$$T_{(s,m,i,q)} = \log b_{s,m,i}(\xi_{i,q}) \quad (8)$$

Also, with respect to the addlog calculation, there is a method for making it higher as given below.

A method for using a calculation max that uses a maximum value instead of the addlog.

A method for applying the expression (9) while using a table of log (1+x).

$$\mathrm{addlog}(x,y) = \begin{cases} x & \text{if } x \gg y \\ x + \log(1 + e^{y-x}) & \text{if } x > y \\ y + \log(1 + e^{x-y}) & \text{if } x < y \\ y & \text{if } x \ll y \end{cases} \quad (9)$$

However, the following problems are encountered when applying the conventional example described above:

In order to obtain the adaptability of the inputted pattern in accordance with the expression (4), the table should be referred to $M_s \cdot N$ times, multiplication should be carried out $M_s \cdot (N+1)$ times, and addition should be made $(M_s-1)$ times per reference pattern s. The greater the number of reference patterns, the more increases the amount of calculation. In other words, for the expression (4), the amount of calculation increases substantially in proportion to the $M_s$.

Also, for the expression (7), the table should be referred to $M_s \cdot N$ times and the addition should be made $M_s \cdot (N+1)$ times, and then, the addlog calculation is needed per reference pattern s. Particularly, for the addlog calculation, an exponential calculation should be made $M_s$ times, addition is required $(M_s-1)$ times, and then, one logarithmic calculation is needed per reference pattern. Even for a simple addlog calculation method, conditional decisions, as well as logarithmic calculation should be made.

Therefore, in order to execute processes at a higher speed with respect to either the expression (4) and the expression (7), it is desirable to provide a technique that does not bring about any significant increase of the calculation amount even when the $M_s$ becomes greater.

SUMMARY OF THE INVENTION

In accordance with the present invention, a quantization code book is designed and stored to provide the representative set of values for each of the dimensional values of an inputted value. The dimensions of feature vector space are classified into a dimension that outputs a value setting each individual function forming the reference pattern functions of mixture density type to be different greatly from each other, and a dimension that outputs a value setting each individual function forming the reference pattern functions of mixture density type to be all close to each other. For each of the dimensions thus classified to output a value setting each individual function forming the reference pattern functions of mixture density type to be different greatly from each other, each of the output values is calculated with respect to the representative values stored on the quantization code book described above, and stored as a single-output table. For each of the dimensions thus classified to output a value setting each individual function forming the reference pattern functions of mixture density type to be all close to each other, each of the output values is calculated with respect to the representative values stored on the quantization code book described above, and stored as a mixture-output table. In this way, it is possible to prepare the information needed for making the adaptability calculation easier with respect to the reference patterns required for executing the pattern recognition.

In accordance with the present invention, each dimensional value of the inputted feature vectors is quantized by use of the quantization code book described above. With respect to each of the dimensions that outputs a value setting each individual function forming the reference pattern functions to be different greatly from each other, a value obtained by referring to the single-output table is accumulated as single-output data. With respect to each of the dimensions that outputs a values setting each individual function forming the reference pattern functions to be all close to each other, a value obtained by referring to the mixture-output table is accumulated as mixture-output data. Then, by means of the single-output data and the mixture-output data, the adaptability between the inputted feature vector and the reference pattern is determined. In this way, it is possible to reduce the amount of calculation required for working out the adaptability with respect to the reference pattern function, which is needed for executing the pattern recognition. This arrangement contributes to reducing the load exerted on an apparatus, hence enhancing the processing efficiency significantly.

In accordance with the present invention, the reference pattern is discriminated for the re-calculation of an adaptability depending on such adaptability that has been determined as described above. Therefore, it is possible to obtain an adaptability more accurately, because the adaptability of the reference pattern thus discriminated is re-calculated.

In accordance with the present invention, the re-calculation of the adaptability is carried out in assumption that a value setting each individual function forming the reference pattern functions of mixture density type is output all over the dimensions. Therefore, it is possible to execute the required processing in a manner more adaptable to the reference patterns.

In accordance with the present invention, the adaptability between the reference patterns and the data for learning use is calculated by use of the representative value of each output of functions that form the reference pattern functions for the dimension having each individual function forming the reference pattern functions, which are found to output values all close to each other. Then, if a reference pattern is determined to be appropriate in accordance with the adaptability thus calculated, such reference pattern is stored for use of recognition. In this way, data for learning use are provided, thus making it possible to prepare reference patterns adaptable to such data for learning use.

In accordance with the present invention, an inputted pattern is recognized by means of the reference patterns thus stored. Therefore, it is possible to carry out recognition with a high recognition rate by use of the reference patterns whose conditions are in a desired state.

DETAILED DESCRIPTION OF THE PREFERRED EMBODIMENTS (First Embodiment)

Hereinafter, with reference to the accompanying drawings, the description will be made of one embodiment in accordance with the present invention.

Here, the present invention can be utilized for recognizing the voice, image, and other patterns.

Figure 1:
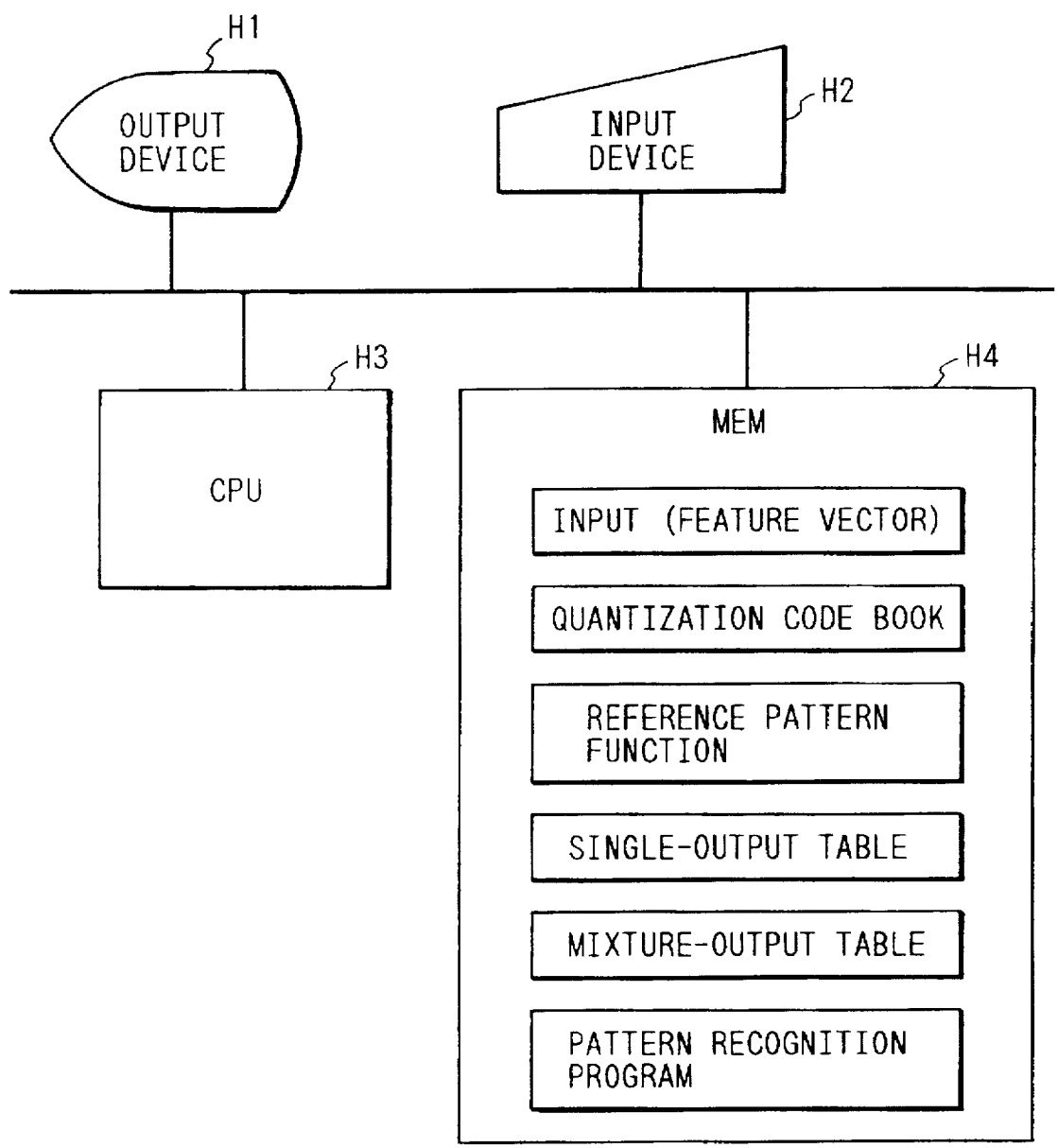
FIG. 1 is a block diagram showing the structure of an apparatus for processing information embodying the present invention.

FIG. 1 is a block diagram showing the structure of an apparatus for processing information in accordance with one embodiment of the present invention.

In FIG. 1, a reference mark H1 designates an output device that outputs a result of pattern recognition or a response obtained as a result of pattern recognition. This device is such displaying means as a CRT or a liquid crystal display, or an LBP or a printer of an ink jet type.

A reference mark H2 designates an input device that inputs a recognition object such as a voice or an image. The voice is inputted through a microphone, while the image is inputted through a scanner. Also, it may be possible to input both the voice and image that are inputted by external devices through communication means.

A reference mark H3 designates a central processing unit (CPU) to execute arithmetic operation, controls, and the like. The CPU performs various controls and calculations in accordance with the control program stored in a memory device H4.

The reference mark H4 designates the external memory device such as disc unit, and the internal memories such as RAM, ROM, and others. The control programs represented by flowcharts, which will be described later, are stored thereon. Also, there are stored on them, the provisional data required for executing the procedures and processes in accordance with the present invention; the reference pattern functions; the quantization book needed for Scalar quantization; and the single-output table and mixture-output table, which serve as the tables of output values of the reference pattern functions.

With the aforesaid hardware structure in view, one embodiment will be described in accordance with the present invention.

Figure 2:
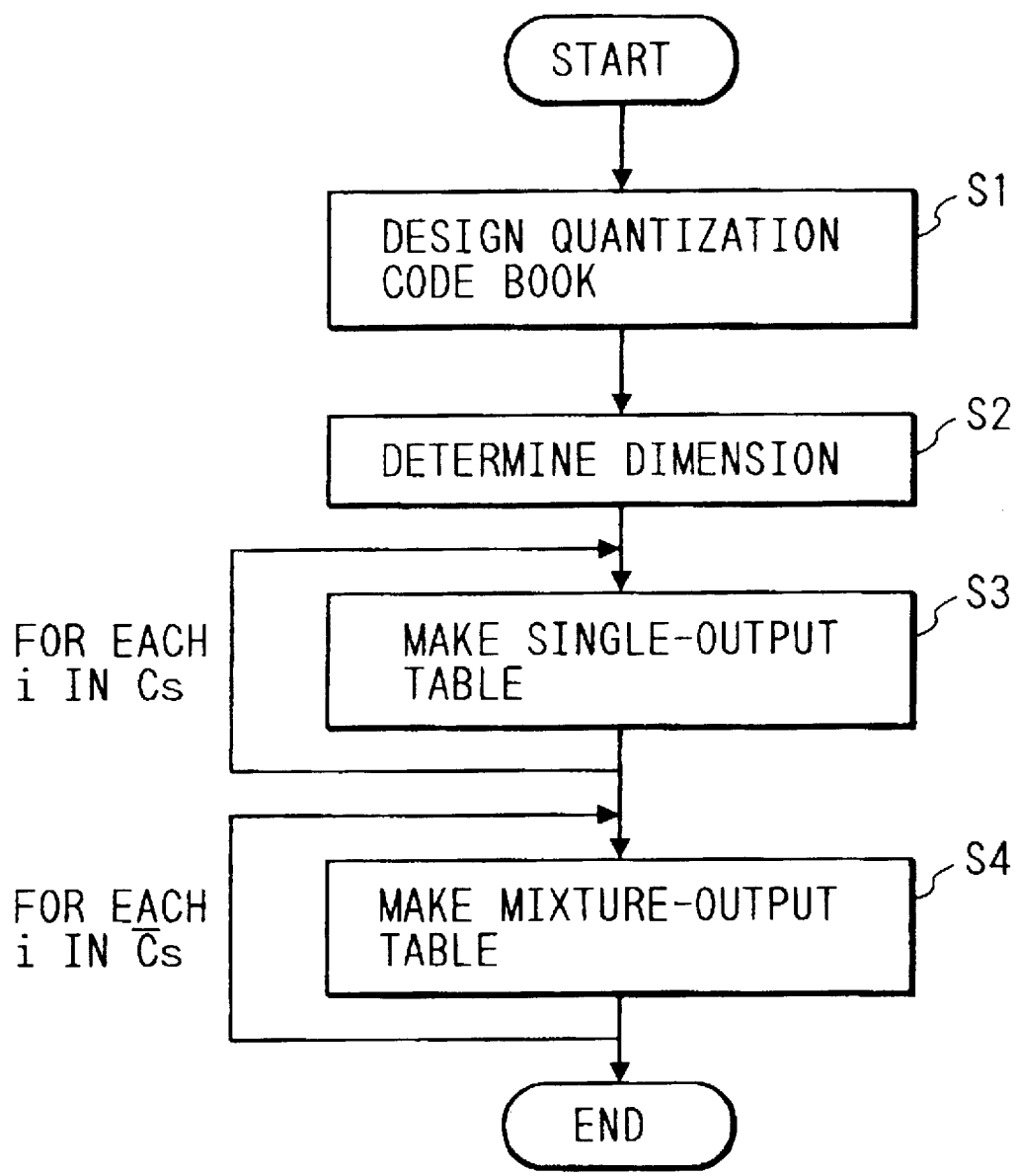
FIG. 2 is a flowchart showing the pre-process of pattern recognition in accordance with one embodiment of the present invention.
Figure 3:
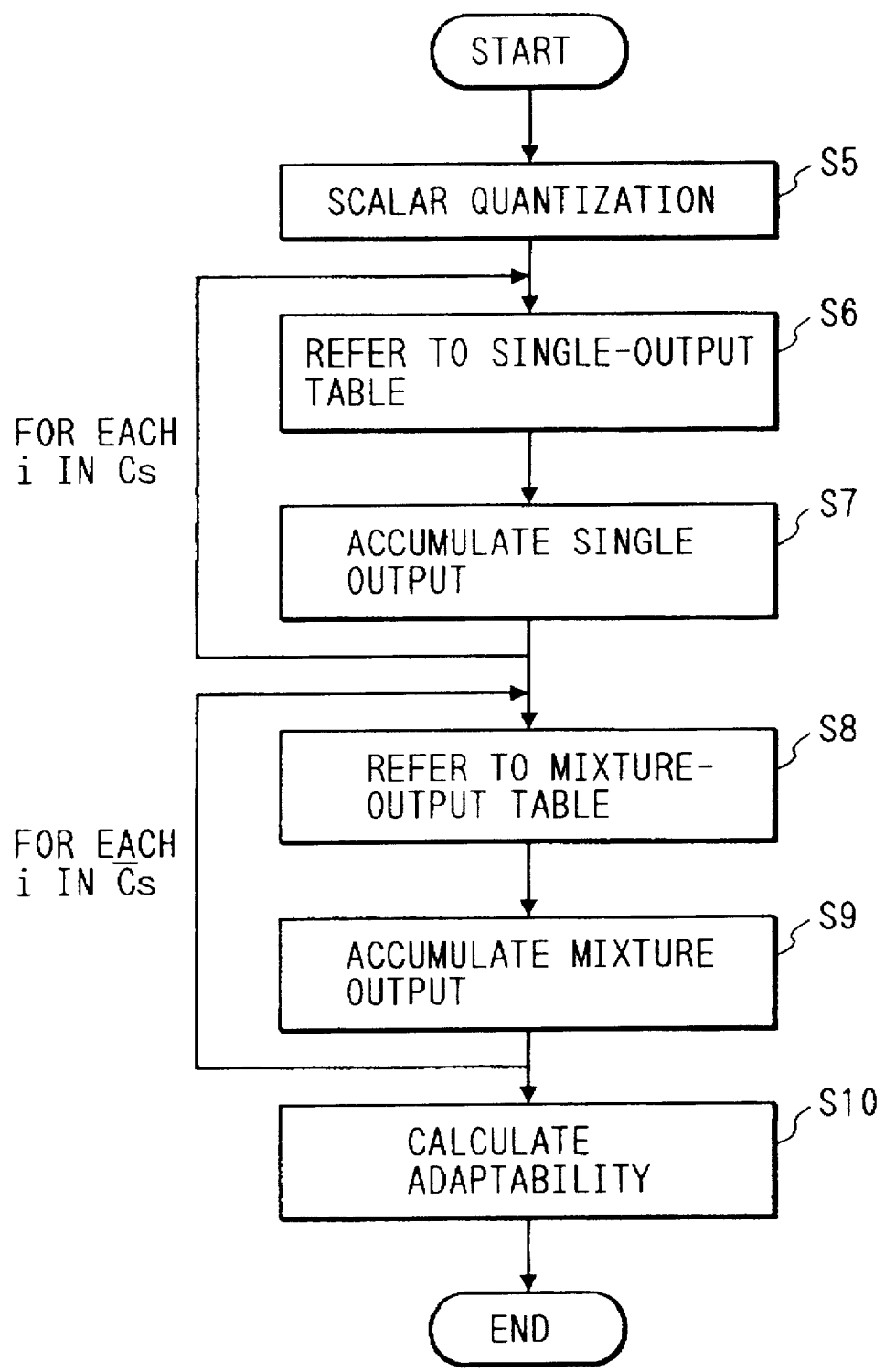
FIG. 3 is a flowchart showing a process at the time of pattern recognition.
Figure 4:
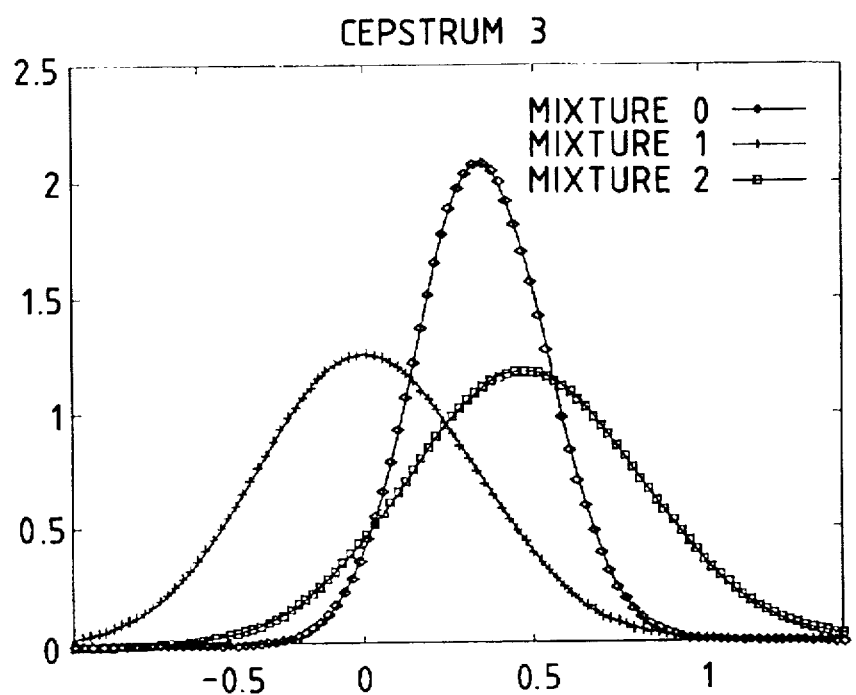
FIG. 4 is a view which shows the example of the reference pattern function of the three mixture numbers, illustrating the dimension that outputs values whose three functions differs greatly with respect to an input.
Figure 5:
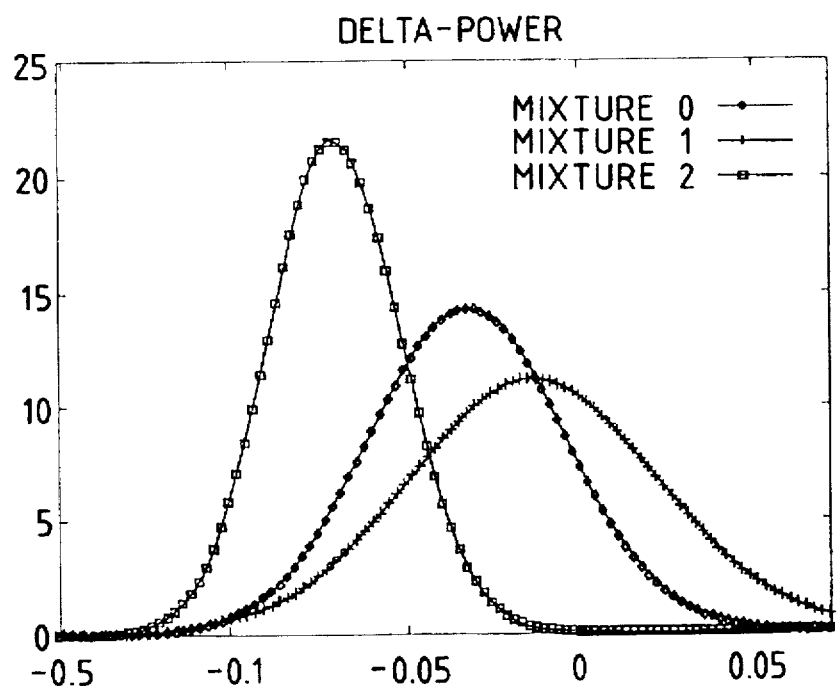
FIG. 5 is a view which shows the example of the reference pattern function of the three mixture numbers, illustrating the dimension that outputs values whose three functions differs greatly with respect to an input.
Figure 6:
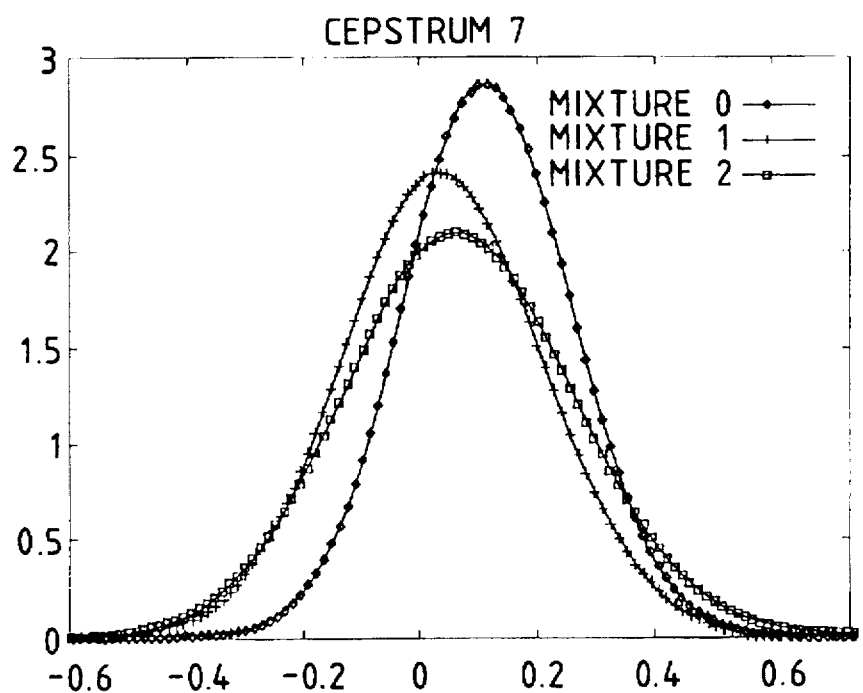
FIG. 6 is a view which shows the example of the reference pattern function of the three mixture numbers, illustrating the dimension that outputs values whose three functions do not differ very much with respect to an input.
Figure 7:
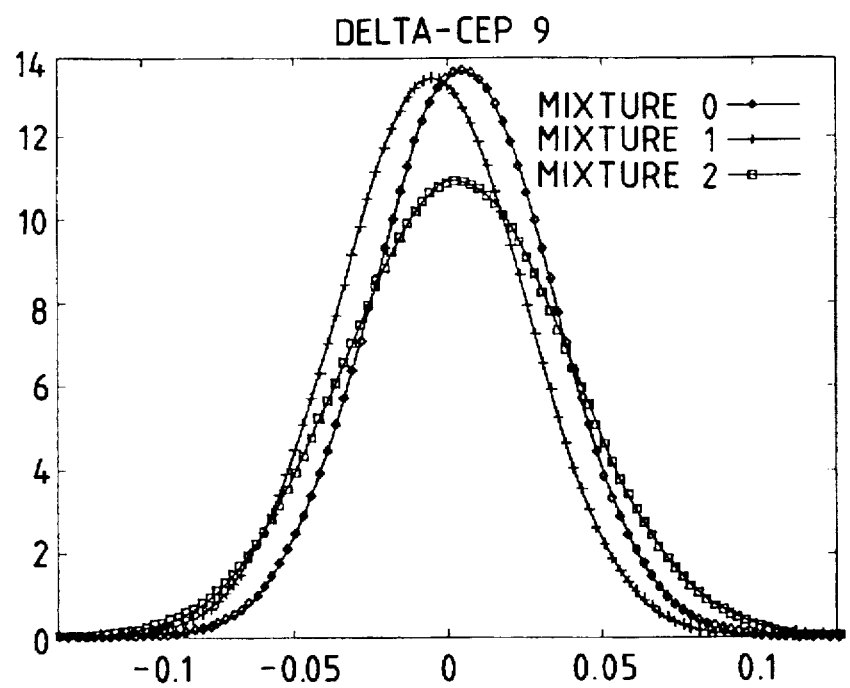
FIG. 7 is a view which shows the example of the reference pattern function of the three mixture numbers, illustrating the dimension that outputs values whose three functions do not differ very much with respect to an input.

FIG. 2 and FIG. 3 are flowcharts showing one embodiment of the present invention.

At first, before the execution of a pattern recognition, the following processing will be carried out:

At first, in the step S1 of designating the design of the quantization book, the representative set of input values of $\{\xi_{i,q}|q=1, 2, \ldots Q_i\}$ is prepared. Here, the $Q_i$ is the number of representative values at the ith dimension.

Then, in the dimensional determination step S2, the dimension of the feature vector space is divided into two kinds, $C_s$ and $\bar{C}_s$ for each s. In other words, $$C_s \odot \bar{C}_s = \{i|i=1, 2, 3, \ldots, N\} \quad (10)$$

$$C_s \cap \bar{C}_s = 0 \quad (11)$$

Here, the $C_s$ is the dimension where each of the functions forming the mixture density function is inputted, and is the set of dimensions that output the significantly different values with respect to $$X_{i \in C_s}.$$

The $\bar{C}_s$ is the dimension where each of the functions forms the mixture density function, and is the set of dimensions that output the values each of which is all the same with respect to $$X_{i \in \bar{C}_s}.$$

Also, given the elemental number of $C_s$ as $Nc_s$, and the elemental number of the $\bar{C}_s$ as $N\bar{c}_s$, the following is obtainable:

$$(Nc_{s,i} + N\bar{c}_{s,i} = N)$$

For example, FIG. 4 to FIG. 7 are views showing four kinds of appropriate dimensions of reference pattern function of three mixture numbers. From FIG. 4 and FIG. 5, it is understandable that three functions output significantly different values with respect to an input. In contrast, the values output by the three functions are not different very much with respect to an input in FIG. 6 and FIG. 7. Therefore, the dimensions represented in FIG. 4 and FIG. 5 belong to the $C_s$. Those shown in FIG. 6 and FIG. 7 belong to the $\bar{C}_s$.

Then, in the single output table formation step S3, a single-output table of $$Tc_s (s, m, i, q)$$

is prepared by repeating the step S3 of calculating $b_{s,m,i}(\xi_{i,q})$ for all the $\xi_{i,q}$ of the dimension i belonging to the $C_s$. The single-output table thus prepared is stored on the single-output table storage area in the memory device H4.

Then, in the mixture-output table formation step S4, the step S4 of calculating the representative value, the $\bar{b}_{s,i}(\xi_{i,q})$, of the $b_{s,m,i}(\xi_{i,q})$ is repeated with respect to the m for every $\xi_{i,q}$ of the dimension i belonging to the $\bar{C}_s$, thus preparing the mixture-output table, $$T\bar{C}_s (s, i, q).$$

The mixture-output table thus prepared is stored on the mixture table storage area in the memory device H4.

Here, as the representative value $\bar{b}_{s,i}(\xi_{i,q})$ with respect to the m of the $b_{s,m,i}(\xi_{i,q})$, it is conceivable to apply the average value (expression (12)), the weighted average value (expression (13)), the maximum value (expression (14)), or the like.

$$\overline{b}_{s,i}(\xi_{i,q}) = \frac{1}{Nc_s} \sum_{m=1}^{M_s} b_{s,m,i}(\xi_{i,q}) \quad (12)$$

$$\overline{b}_{s,i}(\xi_{i,q}) = \sum_{m=1}^{M_s} w_{s,m} b_{s,m,i}(\xi_{i,q}) \quad (13)$$

$$\overline{b}_{s,i}(\xi_{i,q}) = \max_{m=1}^{M_s} w_{s,m} b_{s,m,i}(\xi_{i,q}) \quad (14)$$

Now, with reference to a flowchart shown in FIG. 3, the description will be made of a pattern recognition process.

At first, in the Scalar quantization step S5, a number $\hat{q}_i$ is obtained, which makes the inputted value $$(\xi_{i,q_i} - x_i)^2$$

minimum with respect to each of the dimensional values $x_i$ of an input x.

Then, in the step S6 of referring to the single-output table, the single-output table stored on the memory device H4, which belongs to the $C_s$, is referred to, and $$Tc_s\ (s,\ m,\ i,\ \hat{q}_i)$$

is obtained (step S7).

Then, the accumulation of $$Tc_s\ (s,\ m,\ i,\ \hat{q}_i)$$

obtained by means of the table reference in the step S6 and by referring to such table in the step S7 is repeated with respect to the m, thus obtaining $$\hat{b}_s,\ c_s\ (x).$$

This $\hat{b}_s,\ c_s\ (x)$ thus obtained is stored on the memory device H4.

$$\hat{b}_s, c_s(x) = \sum_{m=1}^{M_s} w_{s,m} \prod_{i \in C_s} Tc_s(s,m,i,\hat{q}_i) \quad (15)$$

Then, in the step S8 of referring to the mixture-output table, the mixture-output table stored on the memory device H4 is referred to the $\overline{C}_s$ that belongs to i, thus obtaining $\overline{Tc}_s\ (s,\ i,\ \hat{q}_i)$ (step S9).

Then, the accumulation of $\overline{Tc}_s\ (s,\ i,\ \hat{q}_i)$ obtained by means of the table reference in the step S8, and by referring to such table in the step S8 is repeated with respect to the $i \in \overline{C}_s$, thus obtaining $$\hat{b}_s,\ \overline{c}_s\ (x)$$

represented by the expression (16). This $\hat{b}_s,\ \overline{c}_s\ (x)$ thus obtained is stored on the memory device H4.

$$\hat{b}_s, \overline{c}_s(x) = \prod_{i \in \overline{C}_s} \overline{Tc}_s(s,i,\hat{q}_i) \quad (16)$$

Then, in the step S10 of calculating the adaptability, the product of the $\hat{b}_s,\ c_s\ (x)$ and $\hat{b}_s,\ \overline{c}_s\ (x)$ stored on the memory device H4 in the step S7 and step S9 is worked out to obtain the approximate value of the adaptability $b_s\ (x)$ between the reference pattern s and an input x.

The processes described above are carried out for the reference patterns stored on a dictionary to be used for the pattern recognition program stored on the memory device H4. In this way, the reference pattern that has been able to obtain the approximate value of the maximum adaptability, $b_s\ (x)$, is output as the result of recognition.

(Second Embodiment)

As described in conjunction with the conventional technique, there may be some cases where the function, log $b_s(x)$, that is the logarithm of $b_s\ (x)$, is used for determining an adaptability.

In such case, the steps of the first embodiment are modified as given below.

At first, in the step S3 of preparing the single-output table, the contents of the table, $Tc_s\ (s,\ m,\ i,\ q)$, to be prepared are: log $b_{s,m,i}\ (\xi_{i,q})$.

Then, in the step S4 of preparing the mixture-output table, the contents of the table are prepared to be:

log $\overline{b}_{s,i}(\xi_{i,q})$.

Here, the representative values of the log $b_{s,m,i}\ (\xi_{i,q})$ with respect to the m are obtained by the expression (17) corresponding to the expression (12); by the expression (18) corresponding to the expression (13); and by the expression (18) corresponding to the expression (14):

$$\overline{b}_{s,i}(\xi_{i,q}) = \log \left\{ \frac{1}{Nc_s} \sum_{m=1}^{M_s} b_{s,m,i}(\xi_{i,q}) \right\} \quad (17)$$

$$\overline{b}_{s,i}(\xi_{i,q}) = \log \left\{ \sum_{m=1}^{M_s} w_{s,m} b_{s,m,i}(\xi_{i,q}) \right\} \quad (18)$$

$$\overline{b}_{s,i}(\xi_{i,q}) = \max_{m=1}^{M_s} \log\{w_{s,m} b_{s,m,i}(\xi_{i,q})\} \quad (19)$$

Then, in the step S7 dealing with the single-output accumulation, the log $\hat{b}_s,\ c_s\ (x)$ is obtained by the expression (20).

$$\log \hat{b}_s, c_s(x) = \operatorname*{addlog}_{m=1}^{M_s} \left\{ w_{s,m} + \sum_{i \in C_s} Tc_s(s,m,i,\hat{q}_i) \right\} \quad (20)$$

Here, it may be possible to apply the high-speed technique of addlog as described in conjunction with the conventional technique.

Then, in the step S9 of the mixture-output accumulation, the accumulative calculation is modified to be as the expression (20) given below.

$$\log \hat{b}_s, \overline{c}_s(x) = \sum_{i \in \overline{C}_s} \overline{Tc}_s(s,i,\hat{q}_i) \quad (21)$$

Then, in the step S10 of calculating the adaptability, the sum of the following is calculated:

log $\hat{b}_s,\ c_s\ (x)$, log $\hat{b}_s,\ \overline{c}_s\ (x)$ (Third Embodiment)

In accordance with the second embodiment, the contents of the single-output table are $Tc_s\ (s,\ m,\ i,\ q)$. At first, this table is modified to be log $b_{s,m,i}\ (\xi_{i,q})$ in the step S3 of preparing the single-output table. However, the contents may be defined as $b_{s,m,i}\ (\xi_{i,q})$. In this case, in the step S7 of the single-output accumulation, the addlog calculation is omitted, the sum is replaced with the product, instead.

Here, the calculation is made by the expression (22) in the step S7 of single-output accumulation.

$$\log \hat{b}_{s,i} c_s(x) = \log \left\{ \sum_{m=1}^{M_s} w_{s,m} \prod_{i \in C_s} T_{C_s}(s,m,i,\hat{q}_i) \right\} \quad (22)$$

(Fourth Embodiment)

As a special case of each of the aforesaid embodiments, there is some case where $C_s=0$. In such case, the step S2 of determining the dimension, the step S3 of preparing the single-output table, the step S6 of referring to the single-output table, the step S7 of single-output accumulation, and the step 10 of calculating the adaptability are omitted. Thus, a result of the step S9 of mixture-output accumulation becomes the adaptability between the reference pattern s and an input x.

Further, if the elemental number of the $C_s$ is 1 and a weighted average value is used as a representative value in the step S4 of preparing the mixture-output table, the obtainable value is equal to the one, which can be obtained when $C_s=0$.

(Fifth Embodiment)

Figure 8:
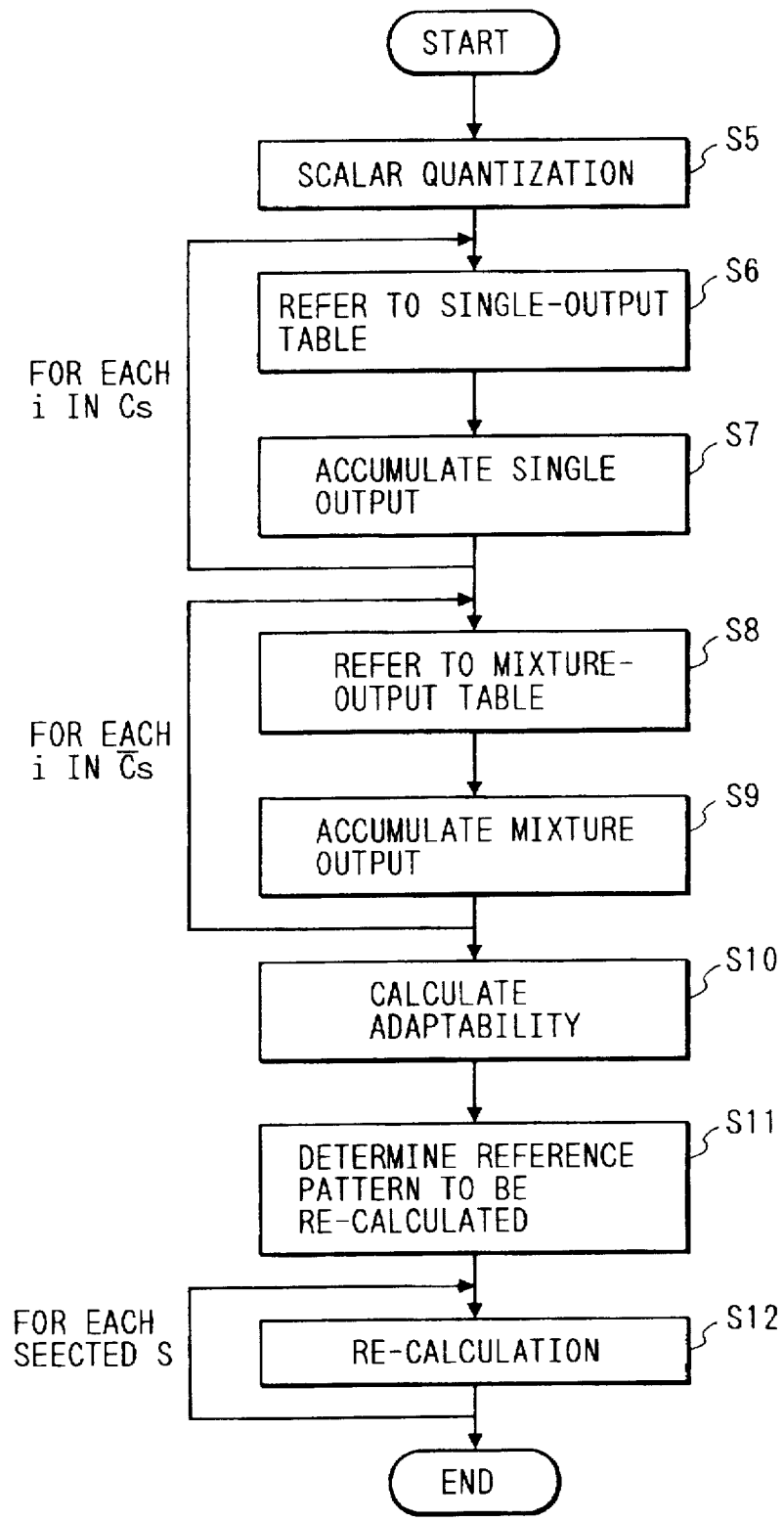
FIG. 8 is a flowchart showing one embodiment of a re-calculation.

In accordance with each of the embodiments described above, it may be possible to work out adaptability more appropriately by the application of a re-calculation process given below after having obtained the adaptability between the entire reference patterns s and an input x. FIG. 8 is a flowchart showing the procedures required for the execution of the processing in such case. In this respect, the same step numbers are applied to the same processing steps appearing on the flowchart shown in FIG. 3. Therefore, the description thereof will be omitted. Here, the description will begin at the step S11. In the step S11 of discriminating the object of re-calculation, the reference pattern, which is treated as an object of adaptability re-calculation, is obtained in accordance with the adaptabilities made available from each of the reference patterns on a recognition dictionary through the execution of the step S5 to step S11. With such method, an appropriate number of reference patterns are defined as objects of re-calculation among the reference patterns thus made available in order of the reference patterns having the greater adaptability with an input x. It is assumed that such number of the reference patterns selected as objects is stored in advance on the memory device H4 as a parameter.

Then, in the re-calculation step S12, the adaptabilities are re-calculated for the reference patterns selected in the step S11 of discriminating the re-calculation object. For the re-calculation of the adaptabilities, the expression (3) or the expression (5), which is described in conjunction with the conventional technique, is applied.

(Sixth Embodiment)

In the re-calculation step S12 of the fifth embodiment, it is possible to apply the conventional method that uses the Scalar quantization.

This is a method whereby to use the high-speed calculation method described in the first to fourth embodiments, while defining the $\overline{C}=0$, and to assume the result thus obtained as the result of such re-calculation.

In other words, for the reference patterns whose adaptabilities should be re-calculated, the single-output table is referred to with respect to all the dimensions i and mixtures m for accumulation.

(Seventh Embodiment)

As a formation method of reference patterns for use of pattern recognition, there is a method whereby to use data for learning use prepared in advance.

In other words, this method is to produce the reference patterns most appropriately with respect to the prepared data for learning use. For the standard of this "appropriateness", the adaptability between the data for learning use and the reference pattern is used.

Figure 9:
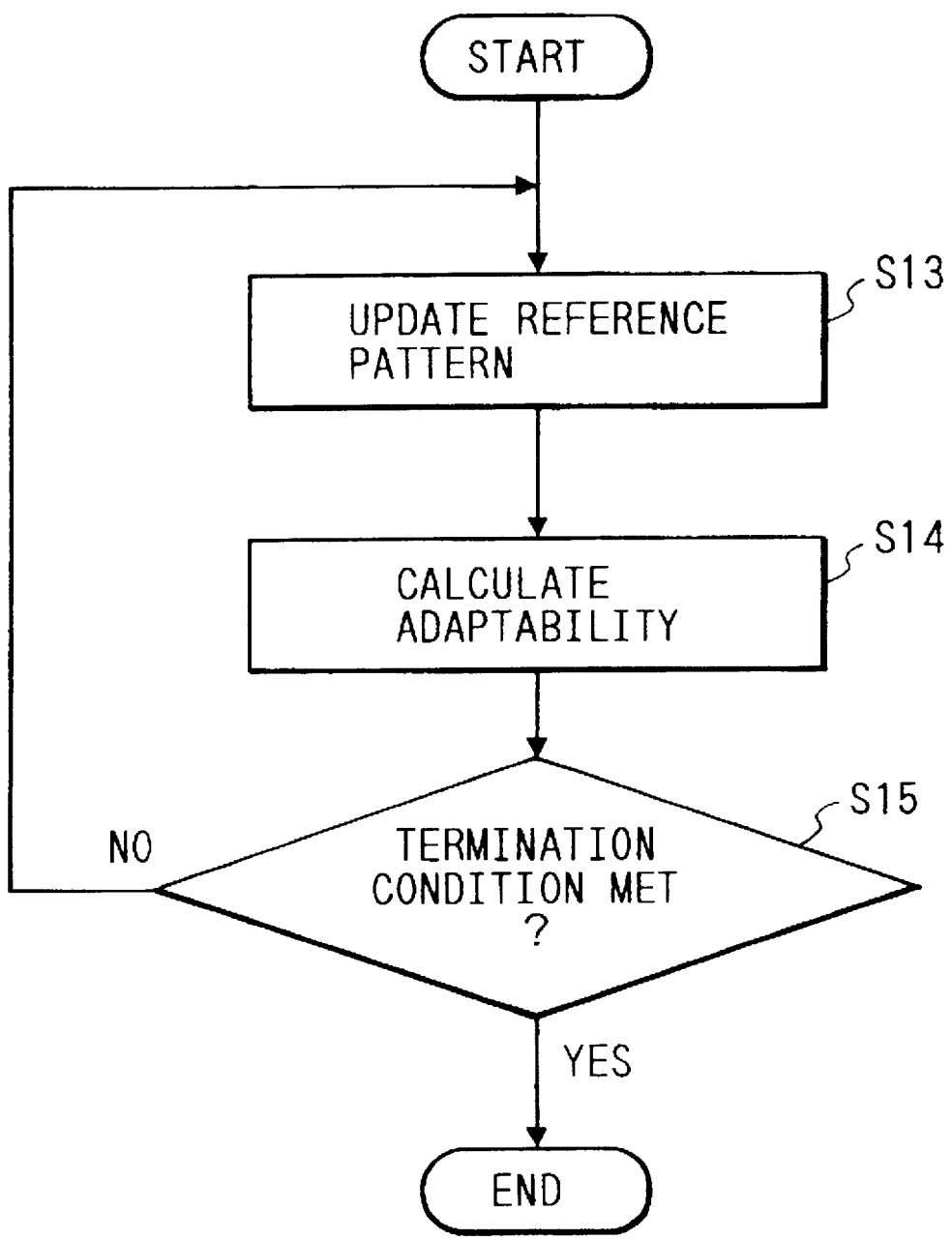
FIG. 9 is a flowchart showing the formation process of reference patterns.

A flowchart shown in FIG. 9 deals with the processing required for the execution of such method.

The adaptability between the data for learning use and the reference patterns, which are stored on the memory device H4, is calculated in step S14. It is interpreted that the terminating condition is satisfied if the adaptability thus calculated exceeds a standard value set in advance (step S15), thus terminating the formation process of reference patterns. If the terminating condition is not satisfied in the step S15, the reference patterns are updated (step S13). Until the terminating condition becomes satisfactory, steps S13 and S14 are repeated.

Also, if the terminating condition to be determined in the step S15 is defined so as to examine not only whether or not the adaptability exceeds the standard value, but also, to determine whether the enhancement rate of the adaptability increases any more or no more, the determination can be made more appropriately. Also, by setting the number of repetition in advance, it is possible to arrange such determination process more simply.

Also, as a method for obtaining the most appropriate reference pattern, there are methods whereby to obtain the reference patterns directly from the adaptability functions, and to update the reference patterns one after another in accordance with an iterative algorithm, such as "EM algorithm".

For this calculation of the adaptability when preparing the reference patterns, it may be possible to apply the adaptability calculation used for the first embodiment. In other words, the step S15 of determining the dimensions is provided for the formation of the reference patterns, and then the adaptability to be applied as the standard of "appropriateness" is defined by the following expression in order to obtain the most appropriate reference pattern:

$$\overline{b}_s(x) = \left\{ \sum_{m=1}^{M_s} w_{s,m} \prod_{i \in C_s} b_{s,m,i}(x_i) \right\} \prod_{i \in \overline{C}_s} \overline{b}_{s,i}(x_i) \quad (23)$$

Figure 10:
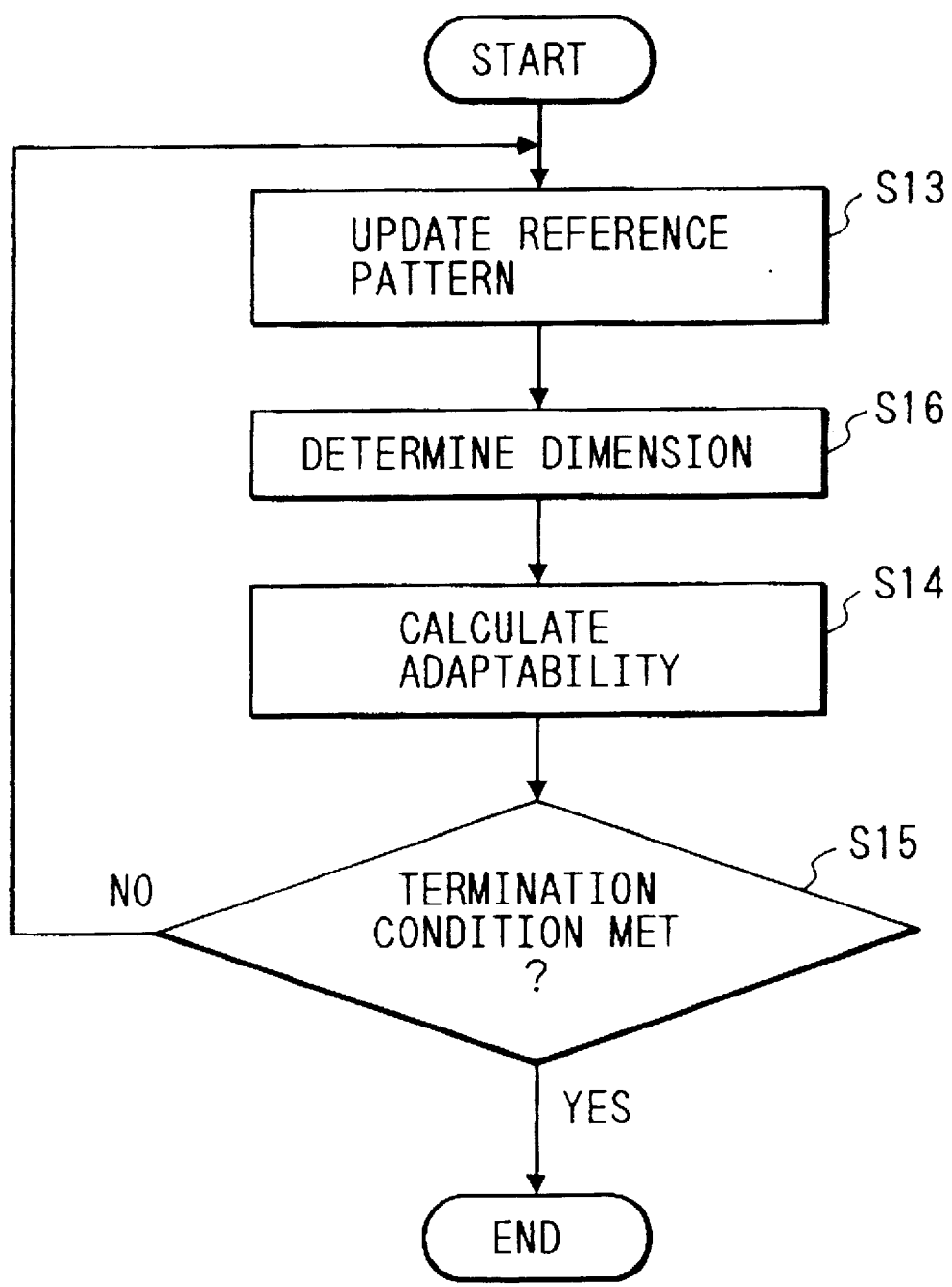
FIG. 10 is a flowchart showing an embodiment to which the adaptability calculation method is applicable: this calculation method is used for the present invention when executing the formation process of reference patterns.
Figure 11:
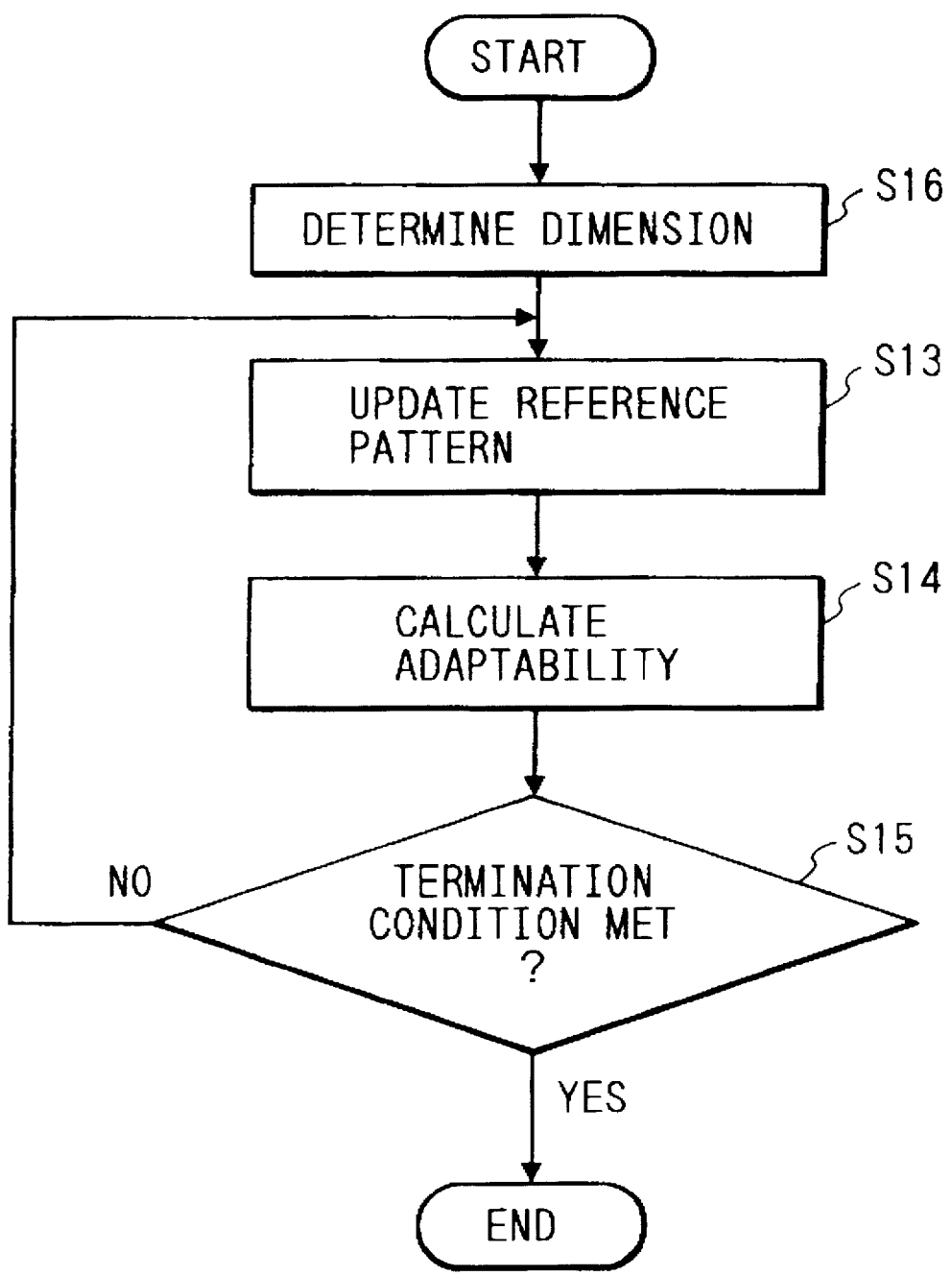
FIG. 11 is a flowchart showing an embodiment to which the adaptability calculation method is applicable: this calculation method is used for the present invention when executing the formation process of reference patterns.

The step S16 of determining dimensions may be executed per iterated process of the iterative algorithm as shown in the flowchart shown in FIG. 10 or maybe executed only once before such iteration.

It may be possible to apply the pattern recognition method described in conjunction with the first to fourth embodiments with respect to the reference pattern thus obtained.

(Eighth Embodiment)

As the representative value, $\hat{b}_{s,i}(x_i)$ with respect to the m of the $b_{s,m,i}(x_i)$ in accordance with the seventh embodiment, it may be possible to use a weighted average value (obtainable by the expression (24)) whose weight differs per dimension:

$$\overline{b}_{s,i}(\xi_{i,q}) = \sum_{m=1}^{M_s} w_{s,m} b_{s,m,i}(\xi_{i,q}) \quad (24)$$

What is claimed is:

1. A method for use in an input pattern recognition system, comprising the steps of:

designing and storing a quantization code book of a set of representative values for each dimensional value of an inputted value;

classifying the dimensions of a feature vector space into a dimension outputting a value setting each individual function forming reference pattern functions of mixture density type to be different greatly from each other, and a dimension outputting a value setting each individual function forming reference pattern functions of mixture density type to be all close to each other;

calculating the output values in accordance with the representative values stored in said quantization code book with respect to each of the dimensions outputting said value setting each individual function forming reference pattern functions of mixture density type to be different greatly from each other, and storing said values as a single-output table; and calculating the output values in accordance with the representative values stored in said quantization code book with respect to each of the dimensions outputting said value setting each individual function forming reference pattern functions of mixture density type to be all close to each other, and storing said values as a mixture-output table.

2. A method according to claim 1, wherein said method comprises the steps of:

quantizing each dimensional value of inputted feature vector by use of said quantization code book;

accumulating the value obtainable by referring to said single-output table as the single-output data with respect to each dimension outputting said value setting each individual function forming said reference pattern functions to be different greatly from each other;

accumulating the value obtainable by referring to said mixture-output table as the mixture-output data with respect to each dimension outputting said value setting each individual function forming said reference pattern functions to be all close to each other; and determining the adaptability between said quantized inputted vector and said reference pattern from said single-output data and said mixture-output data.

3. A method according to claim 2, wherein said method comprises the steps of:

discriminating the reference pattern for the execution of adaptability re-calculation in accordance with said determined adaptability; and re-calculating the adaptability of said discriminated reference pattern.

4. A method according to claim 3, wherein said adaptability calculation is made by a more precise calculation.

5. A method according to claim 2, wherein said adaptability re-calculation is made in assumption that said calculation outputs a value setting each individual function forming the reference pattern functions of mixture density type to be different greatly from each other all over the dimensions.

6. A method according to claim 1, wherein said method comprises the steps of:

calculating the adaptability between said reference pattern and data for learning use by use of the representative value of output values of each of the functions forming the reference patterns with respect to the dimension determined to output each of the functions forming the reference patterns having values all close to each other; and storing said reference patterns for recognition use when said reference pattern is determined to be appropriate in accordance with said calculated adaptability.

7. A method according to claim 6, wherein the inputted pattern is recognized by use of said stored reference patterns.

8. An apparatus for use in an input pattern recognition system, comprising:

quantization code book designing means for designing a quantization code book of a set of representative values of each dimensional value of an inputted value;

classifying means for classifying the dimensions of the feature vector space into a dimension to output a value setting each individual function forming the reference pattern functions of mixture density type to be different greatly from each other, and a dimension to output a value setting each individual function forming the reference pattern functions of mixture density type to be all close to each other;

single-output table storage means for calculating the output value for the representative values stored on said quantization code book with respect to each of the dimensions outputting a value setting each individual function forming said classified reference pattern functions of mixture type to be different greatly from each other, and storing said output values as a single-output table; and mixture-output table storage means for calculating the output value for the representative values stored on said quantization code book with respect to each of the dimensions outputting a value setting each individual function forming said classified reference pattern functions of mixture type to be all close to each other, and storing said output values as a mixture-output table.

9. An apparatus according to claim 8, wherein said apparatus comprises:

quantization means for guantizing each of the dimensional values of the inputted feature vector by use of said quantization code book;

single-output data accumulation means for accumulating the values obtained by referring to said single-output table as single-output data with respect to each of the dimensions outputting a value setting each individual function forming said reference pattern functions to be different greatly from each other;

mixture-output data accumulation means for accumulating the values obtained by referring to said mixture-output table as mixture-output data with respect to each of the dimensions outputting a value setting each individual function forming said reference pattern functions to be all close to each other; and adaptability determining means for determining the adaptability between said quantized inputted vector and said reference pattern.

10. An apparatus according to claim 9, wherein said apparatus comprises:

re-calculating reference pattern discriminating means for discriminating the reference pattern for its adaptability re-calculation in accordance with said determined adaptability; and re-calculation means for re-calculating the adaptability of said discriminated reference pattern.

11. An apparatus according to claim 10, wherein said adaptability re-calculation is made by a more precise calculation.

12. An apparatus according to claim 9, wherein said adaptability re-calculation is made in assumption that said calculation outputs a value having each individual function forming the reference pattern functions of mixture density type to be different greatly from each other all over dimensions.

13. An apparatus according to claim 8, wherein said apparatus comprises the following:

adaptability calculation means for calculating the adaptability between said reference patterns and data for learning use by use of the representative value of each of the output values of functions forming the reference patterns with respect to the dimension determined to output each function forming the reference patterns having values all close to each other; and reference pattern storage means for storing said reference patterns for use of recognition when said reference patterns are determined to be appropriate in accordance with said calculated adaptability.

14. An apparatus according to claim 13, wherein said apparatus is provided with recognition means for recognizing an inputted pattern by use of said stored reference patterns.

* * * * *

UNITED STATES PATENT AND TRADEMARK OFFICE
CERTIFICATE OF CORRECTION

PATENT NO. : 5,706,391

DATED : January 6, 1998

INVENTORS : Masayuki Yamada, et al.

It is certified that error appears in the above-identified patent and that said Letters Patent is hereby corrected as shown below:

COLUMN 6

Line 16, "$C_s \odot \overline{C}_s = \{i | i=1,2,3,...,N\}$" should read
--$C_s \cup \overline{C}_s = \{i | i=1,2,3,...,N\}$.

COLUMN 12

Line 15, "guantizing" should read --quantizing--.

Signed and Sealed this

First Day of December, 1998

Attest:

BRUCE LEHMAN

Attesting Officer

Commissioner of Patents and Trademarks